United States Patent
Mostrom

[11] Patent Number: 5,921,355
[45] Date of Patent: Jul. 13, 1999

[54] AUTOMOBILE ANTI-THEFT DEVICE

[76] Inventor: Lloyd C. Mostrom, 910 N. Montana St., Arlington, Va. 22205

[21] Appl. No.: 08/883,595

[22] Filed: Jun. 26, 1997

[51] Int. Cl.[6] .................................................. F16D 51/00
[52] U.S. Cl. .................................... 188/77 W; 188/77 R; 70/252
[58] Field of Search ........................... 188/77 W, 250 H, 188/259, 249, 77 R; 70/183, 184, 185, 186, 245, 247, 248, 252; 180/271, 287

[56] References Cited

U.S. PATENT DOCUMENTS

| | | | |
|---|---|---|---|
| 1,805,501 | 5/1931 | Tatter | 188/259 |
| 2,780,320 | 2/1957 | Walter | 188/77 R |
| 3,569,930 | 3/1971 | Himama | 340/457 |
| 3,919,867 | 11/1975 | Lipschutz et al. | 70/186 |
| 4,570,468 | 2/1986 | Bemm et al. | 70/252 |
| 4,584,857 | 4/1986 | Weber | 70/184 |
| 4,596,303 | 6/1986 | Tremblay | 180/287 |
| 5,501,304 | 3/1996 | Fini, Jr. | 188/77 W |
| 5,689,983 | 11/1997 | McCoolidge | 70/252 |

FOREIGN PATENT DOCUMENTS

| | | | |
|---|---|---|---|
| 956898 | 10/1974 | Canada | 188/77 R |
| 569493 | 11/1957 | Italy | 188/77 R |

*Primary Examiner*—Robert J. Oberleitner
*Assistant Examiner*—Melanie Talavera

[57] ABSTRACT

The Frustrator—Model C is a small and simple electric powered assembly of common-use components hidden within the automobile steering column enclosure. It inhibits car thefts by anyone not having the ignition key because normal use of the ignition key controls the flow of electric power which either locks the steering rod through braking action, making the automobile impossible to steer when the ignition key is turned to the 'off' position or releases the braking action for normal steering action when the ignition key is turned to the 'on' position.

1 Claim, 2 Drawing Sheets

AUTOMOBILE ANTI-THEFT DEVICE

CROSS REFERENCE TO RELATED APPLICATION

This patent application is related to two provisional patent applications previously submitted:

Frustrator—Model B—application Ser. No. 60/0345,401 dated Dec. 12, 1996, and

Frustrator—Model C Application filed on Feb. 18, 1997 for which a provisional application filing receipt has not been receiver to date.

STATEMENT REGARDING FEDERALLY SPONSORED RESEARCH

Not Applicable

REFERENCE TO MICROFICHE APPENDIX

Not Applicable

BACKGROUND OF THE INVENTION

This invention is in response to a growing frequency of automobile thefts and is designed to frustrate would-be automobile thieves who do not have use of the automobile ignition key. There are on file a number of patent applications that would lock the automoblie steering rod, but none has been found that uses the principle of a brake system or that is controlled automatically by the normal use of the ignition key.

BRIEF SUMMARY OF HE INVENTION

This invention provides automatic locking of the automobile steering mechanism when the ignition key is turned to the 'off' position by using a simple brake band operated by an electric motor energized by electric circuits controlled by the ignition key core [as are many other automobile electric circuits]. A breaker switch attached to the braking mechanism will stop motor action by shutting off the current in this circuit when the braking mechanism reaches a predetermined position. Similarly, the brake mechanism will be released automatically when the ignition key is turned to the 'on' position activating the motor and mechanism in the opposite direction to loosen the brake drum and permit normal steering action. Again a breaker switch attached to the braking mechanism will cut off the electric current when the brake machanism reaches a predetermined position. Being located entirely within the steering column enclosure, installation will not be observable in a casual inspection of the automobiloe interior.

BRIEF DESCRIPTION OF THE SEVERAL VIEWS OF THE DRAWING

There are three figures depicting different views of this invention.

BRIEF DESCRIPTION OF THE INVENTION

Figure 1:
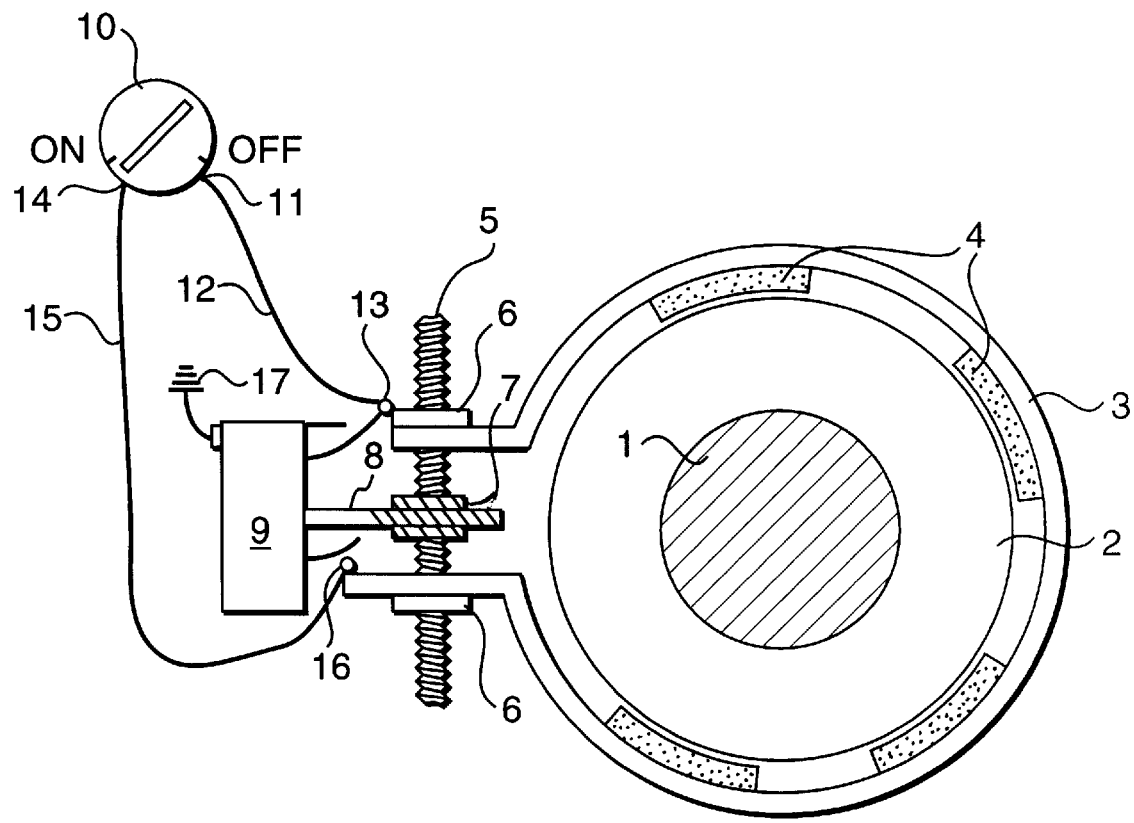
FIG. 1 is a cross section view of the assembly showing the ignition key [10] in the 'on' position [14] in which the spring brake band [3] is in the loosened position and the brake pads [4] are not in contact with the cylindrical collar [2] firmly attached to the steering rod [1]. Thus permitting the steering rod to turn normally without any impedence from the brake mechanism. It is noted that the brake band ends and attached nuts [6] are wide apart and the breaker switch [16] is open. Breaker switch [13] is closed to complete the circuit when the ignition key is turned to the 'off' position.
Figure 2:
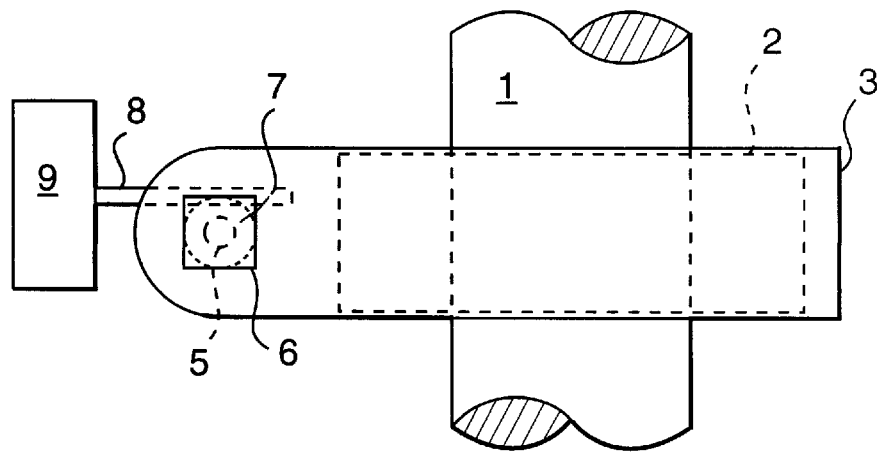
FIG. 2 is a side view to show the relative positions of the motor [9] and its associated worm gear shaft [8] to the worm gear wheel [7] anchored to the threaded bolt [5] which engages nuts [6] to tighten or loosen the spring brake band [3].
Figure 3:
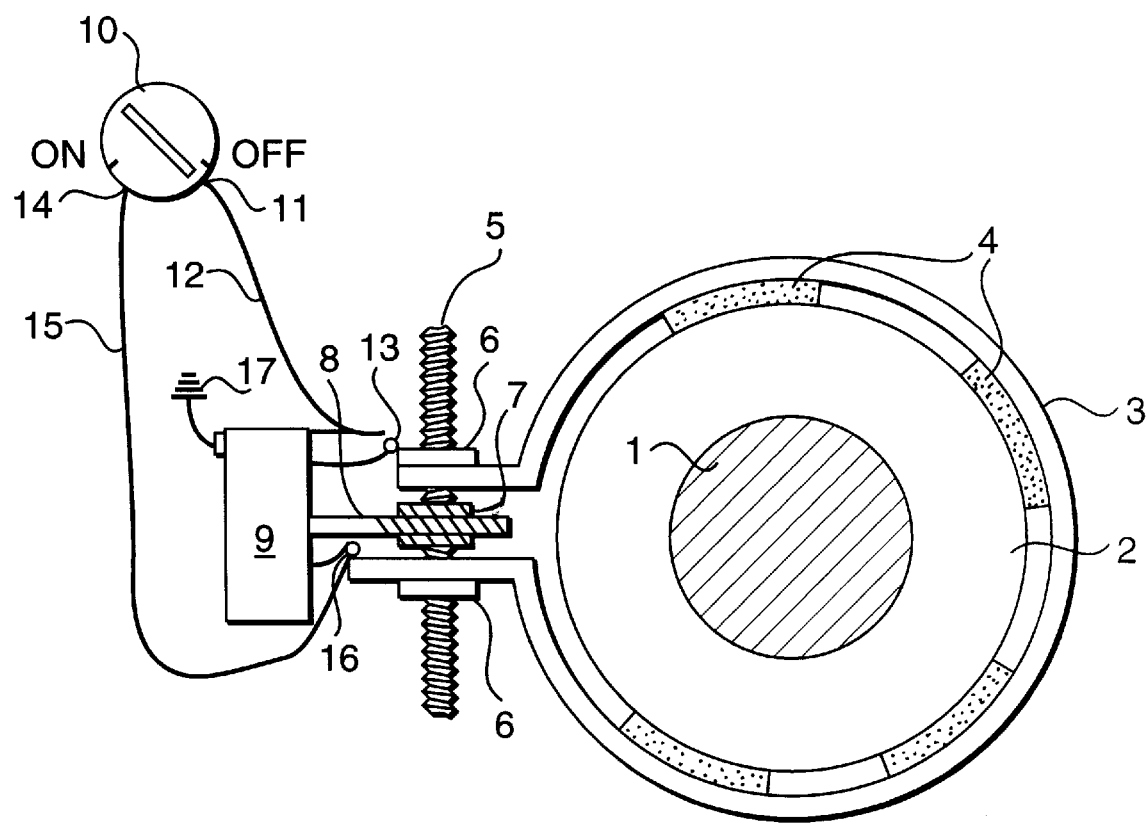
FIG. 3 corresponds to FIG. 1 with the exception that FIG. 3 shows the ignition key in the 'off' position in which the motor [10] (and associated linkage) has tightened the spring brake band [3] causing the brake pads [4] to lock the cylindrical collar [2] and steering rod [1]. The attached Index For Drawing identifies each compomenton of the assembly.

The Frustrator Model C uses a brake band mechanism operated by an electric motor controlled by the ignition key to render the automobile impossible to steer when the ignition key is in the 'off' position. Conversely, the brake band is fully released when the ignition key is in the 'on' position and the automobile is steered normally.

DETAILED DESCRIPTION OF THE INVENTION

The Frustrator Model C is a simple device located within the steering column enclosure and controlled by the ignition key, thus making it indiscernable and tamper-proof without dismantling the steering column enclosure. Numbers in the following description identify parts shown in the drawings and the index thereto.

The Frustrator Model C consists of the following components located in a cage firmly anchored within the steering column enclosure and consists of:

a. A cylindrical collar [2] fitted on the steering rod [1] to provide increased leverage for braking action b. A one piece spring band [3] fitted with brake pads [4] and encompassing the cylindrical collar [2]. The two ends of this band are bent so as to be parallel and are fitted with nuts [6] threaded in opposite directions c. A threaded bolt [5] cradled by the cage and with sections threaded in opposite directions to match the two brake band nuts and fitted in the center with a worm gear wheel [7]

d. A worm gear shaft 181 mating with the worm gear wheel [7] and driven by e. A bi-directional electric motor [9] which will turn in either direction as controlled by f. three insulaterd electric wires of which two [12] and [15] are connected to contacts [11] and [14] on the ignition key core [10] and each having a circuit breaker switch [13] and [16] adjusted to stop the motor when the brake band ends reach predetermined positions. The third wire [17] is the ground.

g. The two contacts [11] and [14] on the ignition key core are located so as to energize the motor to provide brake tightening action when the ignition key is turned to the 'off' position and brake release action when the ignition key is turned to the 'on' position. In each case the circuit will be broken by a breaker switch when the brake band ends reach a pre-determined position.

Thus, with the Frustrator Model C installed, the automobiole will be impossible to steer when the ignition key is turned to the 'off' position, whereas, when the ignition key is turned to the 'on' position, the automobile will steer normally. This will frustrate any would-be automobile thieves even though they bypass the automobile ignition circuit.

I claim:

1. A device located within a cage in a steering column enclosure and controlled by an ignition key core, thus making it indiscernible and tamper-proof without dismantling the steering column enclosure comprising:

an ignition key;

a cylindrical collar fitted on a steering rod to provide increased leverage for braking action;

a one piece spring band fitted with brake pads and encompassing said cylindrical collar;

a threaded bolt cradled by a cage and with sections threaded in opposite directions to match two brake band nuts and fitted in the center with a worm gear wheel;

a worm gear shaft mating with said worm gear wheel and driven by a bi-directional motor which will turn in either direction;

said bi-directional motor controlled by three insulated electric wires to energize said motor to provide brake tightering action when said ignition key is turned to the 'off' position and brake release action when said ignition key is turned to the 'on' position;

wherein two of said three insulated wires are connected to contacts on said ignition key core and each of said two wires have a circuit breaker switch adjusted to stop said motor when the spring band ends reach predetermned positions and a third of said three insulated wires is a ground.

* * * * *